United States Patent [19]

Uchiyama et al.

[11] Patent Number: 5,710,746
[45] Date of Patent: Jan. 20, 1998

[54] MAGNETO-OPTICAL RECORDING MEDIUM AND READING METHOD WITH MAGNETIC LAYERS OF DIFFERENT COERCIVITY

[75] Inventors: Kenji Uchiyama; Hajime Utsunomiya; Isamu Kuribayashi; Masanori Kosuda; Hiroyasu Inoue, all of Nagano, Japan

[73] Assignee: TDK Corporation, Tokyo, Japan

[21] Appl. No.: 574,138

[22] Filed: Dec. 18, 1995

[30] Foreign Application Priority Data

Dec. 22, 1994 [JP] Japan ................... 6-336564

[51] Int. Cl.$^6$ ................................................ G11B 11/00
[52] U.S. Cl. ............................. 369/13; 428/694 MM
[58] Field of Search ........................ 369/13, 288, 275.4, 369/110, 14, 275.2, 275.3, 109; 360/59, 114; 428/694 MM, 694 ML, 694 EC

[56] References Cited

U.S. PATENT DOCUMENTS 5,187,694  2/1993  Ichihara ........................ 369/13
5,593,791  1/1997  Fugii et al. ............... 428/694 ML

FOREIGN PATENT DOCUMENTS 3-88156A  4/1991  Japan.

*Primary Examiner*—Ali Neyzari
*Attorney, Agent, or Firm*—Watson Cole Stevens Davis, PLLC

[57] ABSTRACT

A magneto-optical disc (1) includes a write/read magnetic layer (4) with high coercivity on a substrate (2) and an auxiliary magnetic layer (6) with low coercivity thereon in a magnetostatically coupled manner. Both the magnetic layers are recorded. Prior to or during reading, an external magnetic field of controlled strength is applied to initialize the auxiliary magnetic layer (6). The recorded magnetization information in the write/read magnetic layer (4) is read out by irradiating reading light from the side of write/read magnetic layer (4). Reading with improved C/N is possible.

17 Claims, 4 Drawing Sheets

MAGNETO-OPTICAL RECORDING MEDIUM AND READING METHOD WITH MAGNETIC LAYERS OF DIFFERENT COERCIVITY

BACKGROUND OF THE INVENTION

1. Field of the Invention

This invention relates to a magneto-optical recording medium and a method for reading the same.

2. Prior Art

Magneto-optical recording media are of great interest as high capacity information carrying media as used in external memories for computers. Information is recorded in magneto-optical recording media by irradiating laser light to the magnetic layer, applying a magnetic field at the same time, and modulating the irradiating light or the applied magnetic field to form record spots or marks. The information is read out by utilizing the Kerr effect.

Many attempts have been made on such magneto-optical recording media to improve their carrier-to-noise (C/N) ratio on reading. Since magneto-optical recording media generally have a single magneto-optical recording layer, most attempts are to alter the composition of the magneto-optical recording layer so as to improve C/N on reading.

SUMMARY OF THE INVENTION

An object of the present invention is to provide a magneto-optical recording medium of a novel structure. Another object of the present invention is to provide a method for reading the magneto-optical recording medium in a novel manner whereby C/N on reading is improved.

The present invention is directed to a magneto-optical recording medium comprising a layered structure of magnetostatically coupled magnetic layers.

In one form, the present invention provides a magneto-optical recording medium comprising at least a first magnetic layer with a relatively high coercivity $H_{c1}$ and a second magnetic layer with a relatively low coercivity $H_{c2}$. The recording medium includes a plurality of sites at which magnetization reversal occurs along a polar Kerr hysteresis curve in a temperature range from room temperature to the temperature of reading light irradiation. The first and second magnetic layers meet the following relationship:

$$|\theta_{k1}|>|\theta_{k2}|$$

wherein $\theta_{k1}$ is an apparent Kerr rotation angle when the first magnetic layer has not undergone magnetization reversal and the second magnetic layer has undergone magnetization reversal and $\theta_{k2}$ is an apparent Kerr rotation angle when both the first and second magnetic layers have undergone magnetization reversal. The first magnetic layer and the second magnetic layer may also be referred to as a write/read magnetic layer and an auxiliary magnetic layer, respectively.

According to the invention, a method for reading recorded magnetization information from the magneto-optical recording medium involves the steps of applying an external magnetic field to the magneto-optical recording medium prior to and/or during reading and irradiating reading light from the side of the first magnetic layer for reading.

The external magnetic field applied for magnetizing the second magnetic layer in one direction has a controlled strength $H_{ini}$. In one preferred embodiment, the magnetic layers satisfy the relationship:

$$H_{c1}>H_{ini}>H_{c2}$$

in a temperature range from room temperature to the temperature of reading light irradiation.

The medium exhibits a minor loop due to the polar Kerr effect in a temperature range from room temperature to the temperature of reading light irradiation. Preferably, when the applied external magnetic field is reduced to zero from the state that the first magnetic layer has not undergone magnetization reversal and the second magnetic layer has undergone magnetization reversal, the Kerr rotation angle remains equal to that before reduction of the applied external magnetic field to zero.

The difference in coercivity between the first and second magnetic layers, that is, $H_{c1}-H_{c2}$, is preferably 2,000 to 15,000 Oe provided that the coercivity is measured from the polar Kerr hysteresis curve in a temperature range from room temperature to the temperature of reading light irradiation.

Preferably, the magneto-optical recording medium further includes a non-magnetic layer which intervenes between the first and second magnetic layers. Alternatively, the second magnetic layer is disposed on the surface of the first magnetic layer which has been subject to interfacial treatment.

With respect to preferred dimensions, the first magnetic layer has a thickness of 150 to 1,500 Å, the second magnetic layer has a thickness of 100 to 2,000 Å, and the non-magnetic layer has a thickness of 10 to 1,000 Å.

ADVANTAGES

According to the present invention, the magnetic layer of the magneto-optical recording medium is constructed as a layered structure including a write/read magnetic layer and an auxiliary magnetic layer in a magnetostatically coupled manner. Before the recorded magnetization of information or simultaneously with reading or both, an external magnetic field is applied to align magnetization directions of portions of only the auxiliary magnetic layer in one common direction for initializing the auxiliary magnetic layer. Thereafter, reading light is irradiated from the side of the write/read magnetic layer to read out the recorded magnetization information. Before the initialization of the auxiliary magnetic layer, the write/read magnetic layer and the auxiliary magnetic layer are in the state that magnetization directions of unrecorded portions as well as recorded marks or spots are the same between the write/read magnetic layer and the auxiliary magnetic layer. After the initialization, magnetization directions of both unrecorded portions and recorded spots are aligned in one common direction only in the auxiliary magnetic layer. Consequently, C/N on reading is improved.

FIG. 4 shows a hysteresis loop that the magnetic layer in the multilayer structure of the invention follows due to the polar Kerr effect from the auxiliary magnetic layer side. This polar Kerr hysteresis curve reveals that when the write/read magnetic layer and the auxiliary magnetic layer are unidirectionally magnetized by applying a sufficient external magnetic field (Hext) and the direction of application of the external magnetic field is then changed to an opposite direction (from + side to − side or vice versa), the Kerr rotation angle (θk) given when the auxiliary magnetic layer with low coercivity has completed reversal, but the write/read magnetic layer with high coercivity has not yet started reversal is apparently greater than the Kerr rotation angle given when both the auxiliary magnetic layer and the write/read magnetic layer have completed reversal. More particularly, when the external magnetic field is changed from + side to − side, the relationship |θk1|>|θk2| is satisfied wherein θk1 is an apparent Kerr rotation angle given when only the auxiliary magnetic layer has undergone magnetization reversal and θk2 is an apparent Kerr rotation angle given when both the auxiliary magnetic layer and the write/read magnetic layer have undergone magnetization reversal. This relationship also stands when the external magnetic field is changed from − side to + side. It is believed that this fact contributes to an improvement in C/N upon reading by initialization.

Japanese Patent Application Kokai (JP-A) No. 88156/1991 discloses a magneto-optical recording medium wherein a read magnetic layer and a record storage magnetic layer are layered one on top of the other in a magnetostatically coupled manner. Information is read out of the medium by initializing the read magnetic layer, transferring the recorded information to the thus initialized read magnetic layer under the impetus of a magnetostatic field created by the recorded magnetization of the record storage magnetic layer, and irradiating reading light from the read magnetic layer side for reading out the transferred magnetization information.

The proposal of JP-A 88156/1991, however, intends to prevent crosstalk between recorded magnetic domains in adjacent tracks, thereby accomplishing a high record density. In this regard, the proposal is different from the present invention. As opposed to the present invention wherein in the layered structure including magnetic layers with different coercivity, the information in the write/read magnetic layer with high coercivity disposed as a lower layer is read out from the lower layer side, the method of JP-A 88156/1991 is to read out the information in the record storage layer with high coercivity disposed as an upper layer from the side of the read magnetic layer with low coercivity disposed as a lower layer. Since the information is read out from the lower or read magnetic layer with low coercivity, signals can be degraded by the surrounding magnetic field during reading, resulting in increased error rates. Since the recorded information is read out without initialization, that is, in the state that the recorded information has been transferred from the record storage magnetic layer to the read magnetic layer, the method of JP-A 88156/1991 fails to provide outputs of quality. Even if initialization is effected, it is difficult to produce acceptable outputs because reading is done from the low coercivity layer side.

BRIEF DESCRIPTION OF THE DRAWINGS

These and further features of the present invention will be apparent with reference to the following description and drawings, wherein.

BEST MODE FOR CARRYING OUT THE INVENTION

In one aspect, the present invention provides a magneto-optical recording medium comprising a magnetic layer structure including a write/read magnetic layer and an auxiliary magnetic layer magnetostatically coupled to one another.

Figure 1:
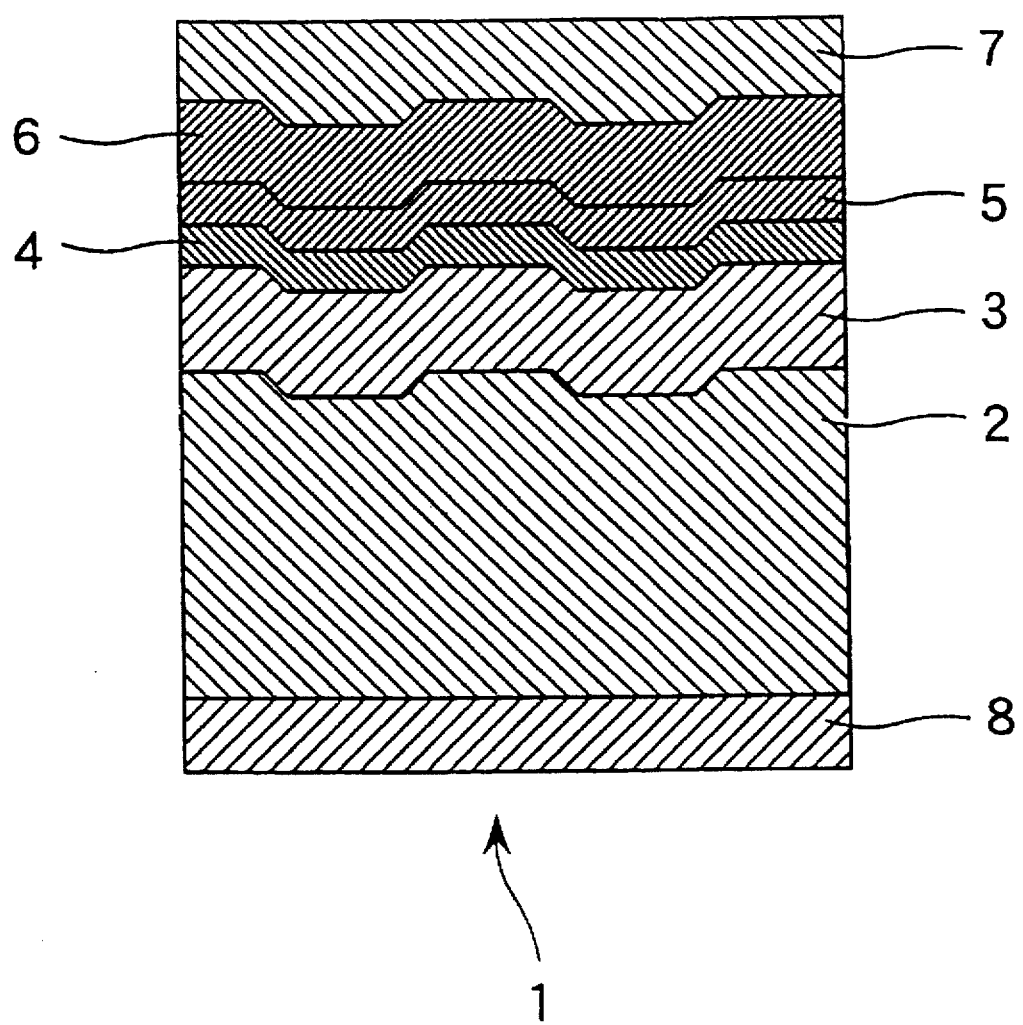
FIG. 1 is a fragmental cross-sectional view of a magneto-optical disc according to one embodiment of the invention.

One typical magneto-optical recording medium is a magneto-optical disc as shown in FIG. 1. The magneto-optical disc generally designated at 1 in FIG. 1 includes an enhancement layer 3, a write/read magnetic layer 4, a non-magnetic layer 5, an auxiliary magnetic layer 6, and a protective coat 7 on one major surface of a substrate 2. The disc may further include a hard coat 8 on another major surface of the substrate 2 remote from the one major surface. Also the non-magnetic layer 5 may be omitted and instead, it is acceptable to effect interfacial treatment on the surface of the write/read magnetic layer 4 to form an oxide layer on which the auxiliary magnetic layer 6 is formed.

In the magneto-optical disc 1 illustrated herein, the non-magnetic layer 5 intervenes between the write/read magnetic layer 4 and the auxiliary magnetic layer 6 for magnetostatically coupling them. The write/read magnetic layer 4 has a relatively high coercivity $H_{c1}$ and the auxiliary magnetic layer 6 has a relatively low coercivity $H_{c2}$, that is, $H_{c1}>H_{c2}$.

According to the invention, the magneto-optical recording medium can be recorded by a conventional process. More particularly, recording may be done in a light modulation mode by applying an external magnetic field and irradiating laser light corresponding to a signal to the medium to achieve local heating whereby a record spot or mark is formed through magnetization reversal. Alternatively, recording is done in a magnetic field modulation mode by switching an applied magnetic field at a high speed to record information.

Figure 2:
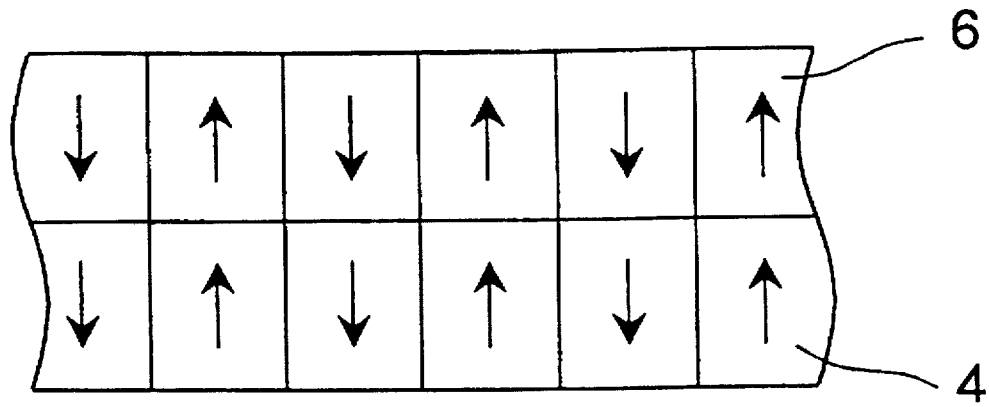
FIGS. 2 and 3 schematically illustrate a magneto-optical writing and reading process according to the invention.

By recording information in this way, similar recorded spots or marks are formed in both the write/read magnetic layer 4 and the auxiliary magnetic layer 6 of the magneto-optical disc of FIG. 1, for example. That is, in both the layers 4 and 6, unrecorded areas have one magnetization direction and recorded spots or marks have an opposite magnetization direction as diagrammatically shown in FIG. 2.

The next step is reading. On reading, the recorded spots or marks representative of recorded magnetization information in the write/read magnetic layer 4 are left unchanged and only the auxiliary magnetic layer 6 is initialized by applying an external magnetic field. The initializing magnetic field may be applied in the same direction as either a recording magnetic field or an erasing magnetic field, typically in the recording magnetic field direction. Then the magnetization of all domains of the auxiliary magnetic layer 6 are aligned in one direction by the initializing external magnetic field from a magnetic field generating means 10 as shown in FIG. 3.

Figure 3:
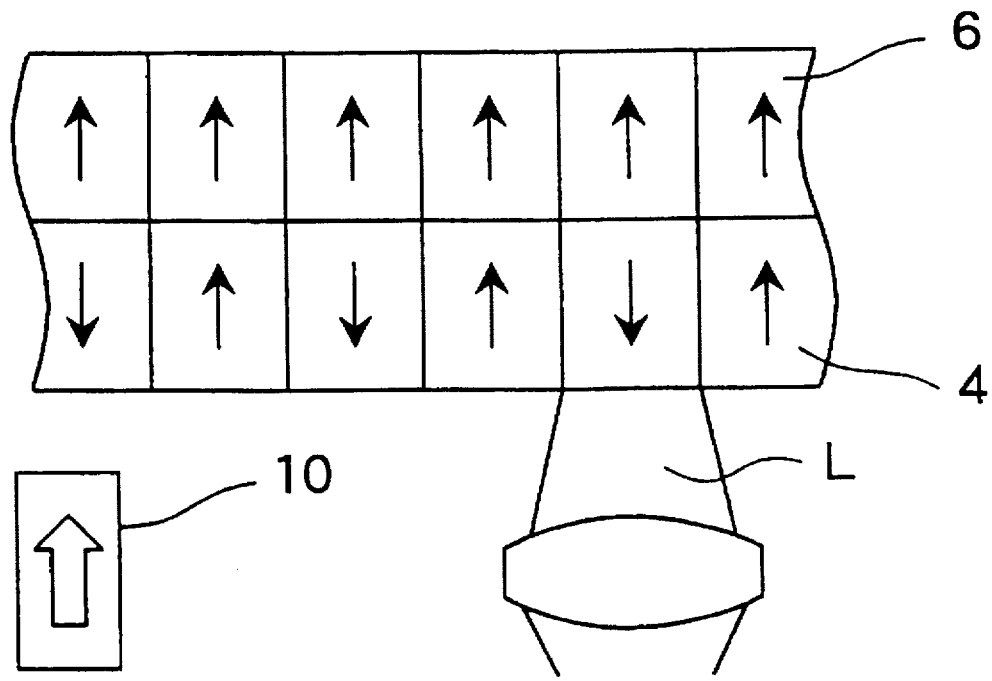

While the auxiliary magnetic layer 6 is maintained in this aligned magnetization state, laser light L as reading light is irradiated toward the magnetic layers from the side of write/read magnetic layer 4 to read the recorded signal as shown in FIG. 3. At this point, the laser light L has a controlled laser power, typically of 1.0 to 2.0 mW, such that the recorded spots or marks of the write/read magnetic layer 4 may not be transferred to the auxiliary magnetic layer 6 again.

In the practice of the invention, initialization of the auxiliary magnetic layer 6 is carried out prior to or during reading of the recorded signal by irradiating reading light. Most often, as mentioned above, initialization is carried out after recorded spots or marks are formed in the auxiliary magnetic layer 6 as well as the write/read magnetic layer 4 using a recording magnetic field which is weaker than the coercivity of the auxiliary magnetic layer 6. Alternatively, initialization is carried out during recording. That is, the auxiliary magnetic layer 6 may be initialized at the same time as record spots or marks are formed in the write/read magnetic layer 4 (i.e., recording), using a recording magnetic field which is stronger than the coercivity of the auxiliary magnetic layer 6 at the recording temperature. In this regard, the recording of the auxiliary magnetic layer 6 encompasses initialization thereof using the recording magnetic field. The initialization conducted before is generally accomplished by applying an external magnetic field once. If desired, the auxiliary magnetic layer 6 may be initialized during reading, by applying an external magnetic field in a reading duration.

Desirably the external magnetic field used for recording has a strength of about 50 to about 100 Oe at room temperature (about 15° to 28° C.), and the external magnetic field used for initializing the auxiliary magnetic layer 6 has a strength of about 150 to about 1,000 Oe at room temperature. When recording and initialization of the auxiliary magnetic layer 6 are simultaneously carried out, the external magnetic field may have a strength of about 150 to about 500 Oe at room temperature. When initialization of the auxiliary magnetic layer 6 is carried out during reading, the external magnetic field may have a strength of about 150 to about 1,000 Oe at room temperature.

In order that the above-mentioned magneto-optical writing/reading method be applicable, the magneto-optical recording medium should preferably satisfy the relationship:

$$H_{c1} > H_{ini} > H_{c2}$$

in a temperature range from room temperature to the temperature of reading light irradiation (e.g., about 30° to 80° C.). It is noted that the write/read magnetic layer 4 has a coercivity $H_{c1}$, the auxiliary magnetic layer 6 has a coercivity $H_{c2}$, and an external magnetic field applied for initializing the auxiliary magnetic layer 6 has a strength $H_{ini}$.

Also desirably, the magneto-optical recording medium should satisfy the relationship:

$$H_s + H_d < H_{c2}$$

at the temperature of reading light irradiation wherein $H_s$ is a strength of a floating magnetic field imparted to the auxiliary magnetic layer 6 from the write/read magnetic layer 4, $H_d$ is a strength of a diamagnetic field of the auxiliary magnetic layer 6, and $H_{c2}$ is as defined above.

The write/read magnetic layer 4 preferably has a coercivity $H_{c1}$ of 5,000 to 15,000 Oe, more preferably 7,000 to 13,000 Oe, most preferably 10,000 to 12,000 Oe as measured in a state layered with the auxiliary magnetic layer (for example, a sample having stacked a write/read magnetic layer of about 200 Å thick and an auxiliary magnetic layer of 800 Å thick with a non-magnetic layer of about 200 Å thick interposed therebetween) from a polar Kerr hysteresis curve over a temperature range from room temperature to the temperature of reading light irradiation. This range of $H_{c1}$ ensures satisfactory recording. Too small values of $H_{c1}$ have a likelihood that record spots or marks be erased by a surrounding magnetic field as produced by TV sets or the like and crosstalk be increased. Too large values of $H_{c1}$ would render difficult the overall initialization at room temperature prior to recording.

The auxiliary magnetic layer 6 preferably has a coercivity $H_{c2}$ of 50 to 3,000 Oe, more preferably 100 to 2,000 Oe, most preferably 150 to 1,000 Oe as measured in the same conditions as the write/read magnetic layer 6 from a polar Kerr hysteresis curve over a temperature range from room temperature to the temperature of reading light irradiation. This range of $H_{c2}$ ensures satisfactory reading. Too small values of $H_{c2}$ would allow record spots or marks of the write/read magnetic layer to be transferred during reading. Too large values of $H_{c2}$ would somehow restrain the magnetization reversal required to align magnetization in one direction upon reading, especially the magnetization reversal upon reading with a drive-mounted magnetic head.

For these and other reasons, better recording and reading are ensured when the difference in coercivity between the write/read magnetic layer 4 and the auxiliary magnetic layer 6, that is, $H_{c1} - H_{c2}$, is 2,000 to 15,000 Oe, preferably 5,000 to 13,000 Oe, more preferably 8,000 to 12,000 Oe provided that coercivity is determined from a polar Kerr hysteresis curve in the layered state as mentioned above.

As to layer dimensions, the write/read magnetic layer 4 preferably has a thickness t1 of 150 to 1,500 Å, more preferably 150 to 700 Å, most preferably 150 to 500 Å. This range of thickness t1 ensures satisfactory recording and reading. A too thin magnetic layer would not fully function as a record bearing layer whereas a too thick magnetic layer would require a too much laser power to record and erase signals and fail to provide sufficient outputs with a conventional drive-mounted semiconductor laser.

The auxiliary magnetic layer 6 preferably has a thickness t2 of 100 to 2,000 Å, more preferably 200 to 1,000 Å. This range of thickness t2 ensures satisfactory reading. A too thin magnetic layer would be less effective for the object of the invention whereas a too thick magnetic layer would require a too much laser power to record and erase signals and fail to provide sufficient outputs with a conventional drive-mounted semiconductor laser.

The non-magnetic layer 5 for magnetostatically coupling the write/read magnetic layer 4 with the auxiliary magnetic layer 6 preferably has a thickness of 10 to 1,000 Å, more preferably 10 to 500 Å. This range of thickness allows the non-magnetic layer to exert its full function. A non-magnetic layer of too reduced thickness would be less effective whereas a non-magnetic layer of too increased thickness would prevent the auxiliary magnetic layer from interacting with the write/read magnetic layer, failing to achieve the object of the invention.

It is noted that the magnetostatic coupling between the write/read magnetic layer 4 and the auxiliary magnetic layer 6 is recognizable from a minor loop of the magneto-optical recording medium in a temperature range from room temperature (about 15° to 28° C.) to the temperature of reading light irradiation (about 30° to 80° C.) due to its polar Kerr effect. That is, when the applied external magnetic field is reduced to zero (0) from the state that the write/read magnetic layer has not reversed its magnetization and the auxiliary magnetic layer has reversed its magnetization, the Kerr rotation angle remains equal to that before reduction of the applied external magnetic field to zero. This feature implies that the magnetization directions of domains of the auxiliary magnetic layer commonly aligned by initialization are maintained unchanged during reading.

Figure 4:
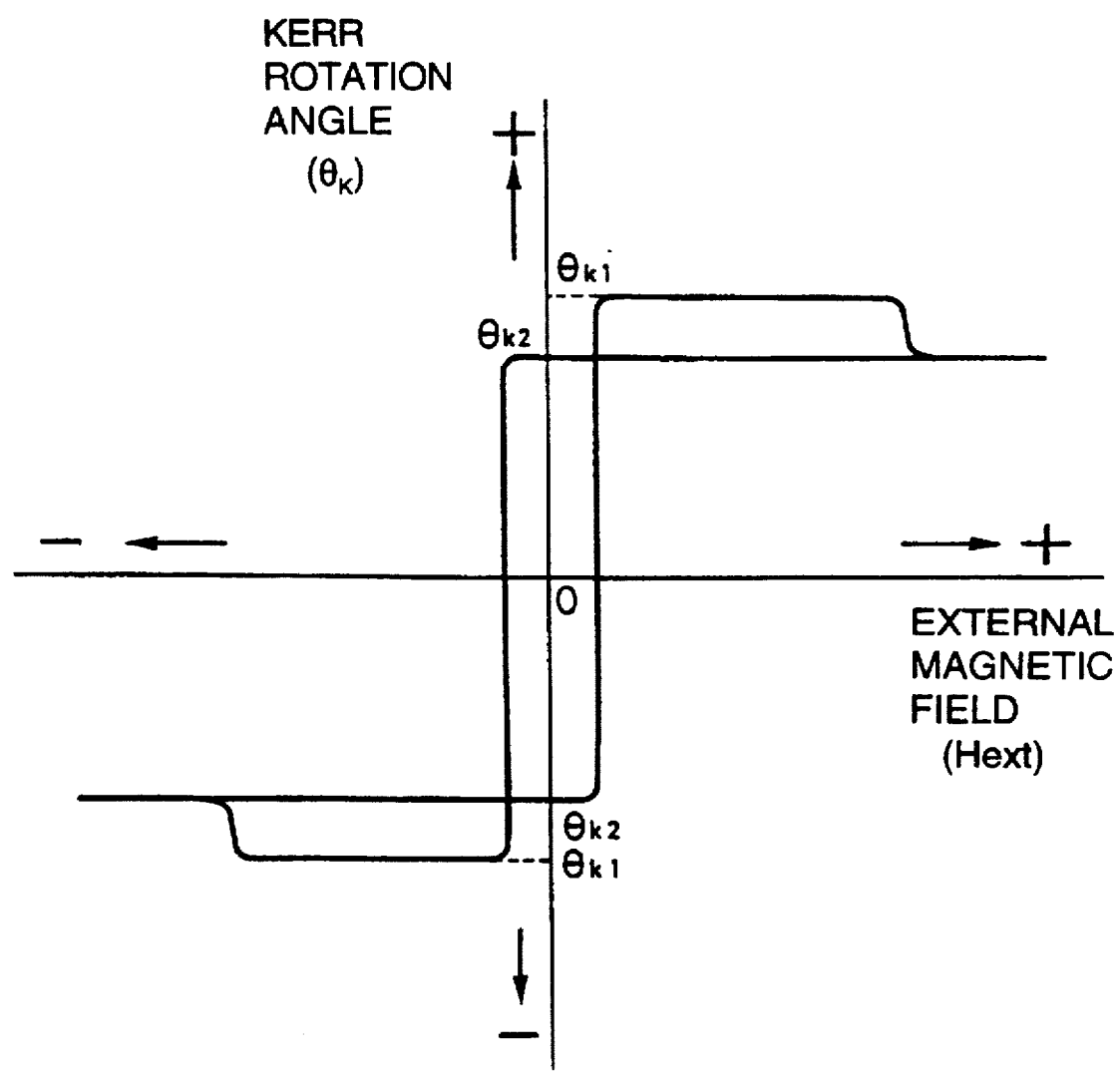
FIG. 4 is a diagram showing a polar Kerr hysteresis curve of the magnetic layer of the inventive layered structure from the auxiliary magnetic layer in a temperature range from room temperature to the temperature of reading light irradiation.

Also, as previously mentioned, a polar Kerr hysteresis curve of the magneto-optical recording medium of the invention from the auxiliary magnetic layer side over a temperature range from room temperature to the temperature of reading light irradiation is shown in FIG. 4. That is, the magneto-optical recording medium of the invention including a plurality of (four in the illustrated embodiment) sites at which magnetization reversal occurs satisfies the relationship:

|θk1|>|θk2| wherein θk1 is an apparent Kerr rotation angle given when the write/read magnetic layer undergoes no magnetization reversal and only the auxiliary magnetic layer has completed magnetization reversal and θk2 is an apparent Kerr rotation angle given when both the auxiliary magnetic layer and the write/read magnetic layer have completed magnetization reversal.

Values of |θk1| and |θk2| vary with the film structure and measuring conditions such as a measuring laser wavelength. In an embodiment wherein the write/read magnetic layer is about 200 Å thick, the auxiliary magnetic layer is about 800 Å thick, and the intervening non-magnetic layer is about 200 Å thick, and the write/read light has a wavelength of about 780 nm, the value of |θk1| is about 0.3 to 1.3°, the value of |θk2| is about 0.2° to 1°, and the value of |θk1|−|θk2| is about 0.05° to 0.5°.

Figure 5:
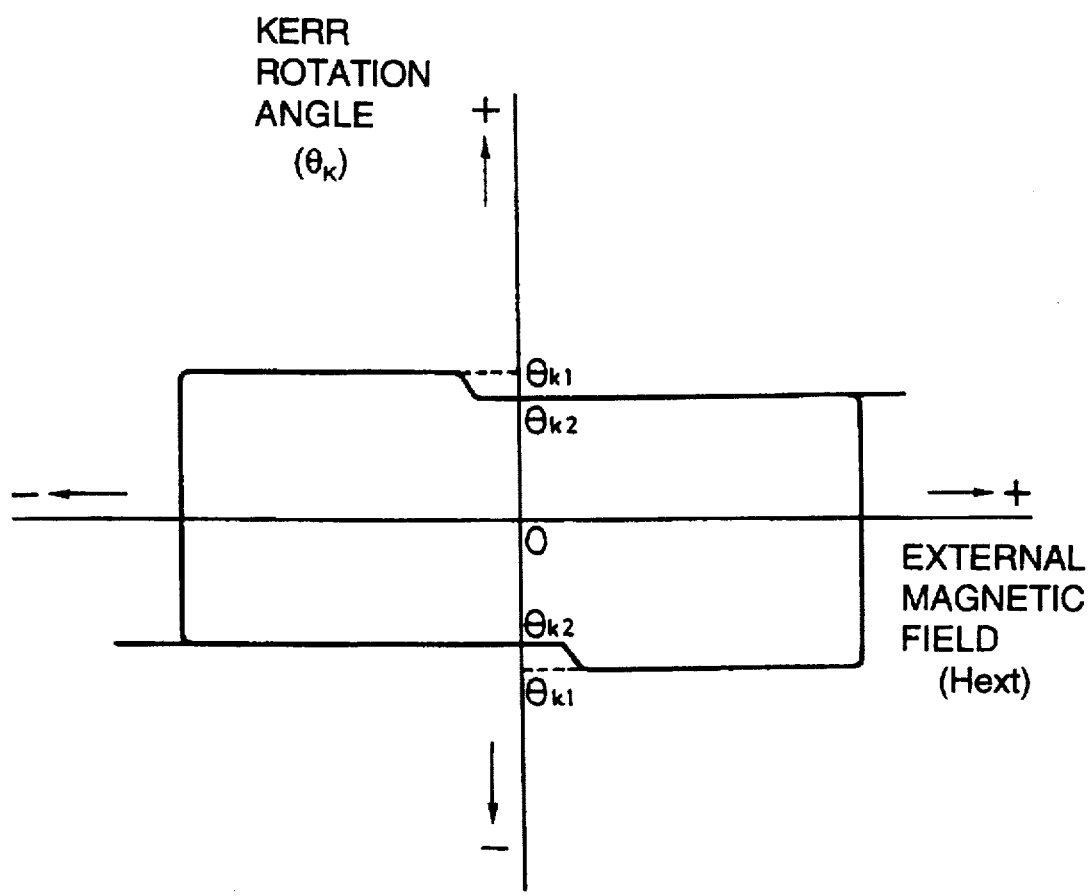
FIG. 5 is a diagram showing a polar Kerr hysteresis curve of the magnetic layer of the inventive layered structure from the write/read magnetic layer in a temperature range from room temperature to the temperature of reading light irradiation.

A polar Kerr hysteresis curve of the magneto-optical recording medium of the invention from the write/read magnetic layer side over a temperature range from room temperature to the temperature of reading light irradiation is shown in FIG. 5. The characteristics of the magnetic layers in the magneto-optical recording medium of the invention are similarly ascertainable from this curve as explained in conjunction with FIG. 4. It is noted that θk1 and θk2 in FIG. 5 is as defined in FIG. 4.

The magneto-optical recording medium of the invention wherein the write/read magnetic layer is a first magnetic layer and the auxiliary magnetic layer is a second magnetic layer satisfies the above-mentioned relationship with respect to the first and second magnetic layers. At least one combination of the first and second magnetic layers satisfying the above-mentioned relationship is included in the medium.

The write/read magnetic layer 4 and the auxiliary magnetic layer 6 each are comprised of a magnetic material, preferably a magnetic material having perpendicular magnetic anisotropy. Such a magnetic material is preferably an alloy containing a rare earth element and a transition element. The preferred rare earth element is at least one element selected from the group consisting of Gd, Tb, Dy, Nd, Sm, Pr, and Ce and the preferred transition element is essentially Fe, optionally containing Co.

The content of these elements may be properly determined in accordance with the desired Curie temperature, coercivity, and reading characteristics. Provided that R stands for a rare earth element, the preferred alloy has a composition $R_A Fe_B Co_C$ wherein A, B and C representing atomic ratios are in the range:

$$10 \leq A \leq 35, \ 55 \leq B \leq 75, \ 3 \leq C \leq 15$$

and $$A+B+C=100$$

In addition to these elements, any additional element such as Cr and Ti may be contained in the magnetic layer, preferably in an amount of up to 12 at %. Some preferred examples of the magnetic layer composition are Tb—Fe—Co, Tb—Fe—Co—Cr, Dy—Tb—Fe—Co, Nd—Dy—Fe—Co, and Gd—Fe—Co, Pt—Co system alloys are also useful.

Each of the write/read magnetic layer 4 and the auxiliary magnetic layer 6 may have either a rare earth element-rich composition or a transition metal-rich composition. Exemplary combinations are given below as expressed in atom percent.

| Combination No. | Write/read magnetic layer | Auxiliary magnetic layer |
|---|---|---|
| 1 | $Tb_{21.1}$—$Fe_{68.7}$—$Co_{7.2}$—$Cr_{3.0}$ | $Gd_{20.3}$—$Fe_{69.7}$—$Co_{10.0}$ |
| 2 | $Tb_{19.5}$—$Fe_{70.5}$—$Co_{7.0}$—$Cr_{3.0}$ | $Gd_{22.0}$—$Fe_{64.0}$—$Co_{14.0}$ |
| 3 | $Tb_{19.0}$—$Fe_{72.0}$—$Co_{6.0}$—$Cr_{3.0}$ | $Gd_{25.0}$—$Fe_{75.0}$ |
| 4 | $Dy_{13.0}$—$Tb_{8.0}$—$Fe_{72.0}$—$Co_{7.0}$ | $Gd_{28.0}$—$Fe_{64.0}$—$Co_{8.0}$ |

Although the write/read magnetic layer is a single layer in the embodiment illustrated in FIG. 1, it may be a multilayer structure having two or more exchange-interacted magnetic laminae having different properties. In the case of a multilayer structure, the above-mentioned relationship of magnetic properties between the write/read magnetic layer 4 and the auxiliary magnetic layer 6 should preferably be met for all write/read magnetic laminae.

Although the Kerr rotation angle of the write/read magnetic layer is not critical, it is generally about 0.2° to about 0.4° when a single layer film is measured.

The non-magnetic layer 5 separating the write/read magnetic layer 4 and the auxiliary magnetic layer 6 is comprised of a non-magnetic material. Typical are dielectric materials, for example, oxides such as $SiO_2$ and $Ta_2O_5$, nitrides such as SiN and AlN, and oxynitrides such as SiAlON. Non-magnetic metal materials such as Al are also useful.

Instead of providing the non-magnetic layer 5, it is acceptable to form an oxide layer by effecting interfacial treatment on the surface of the write/read magnetic layer 4 to oxidize the surface and a sub-layer region. The interfacial treatment may be to expose the surface of the write/read magnetic layer to an atmosphere containing 10 to 1,000 ppm of oxygen in an inert gas such as Ar at 0.1 to 2 Pa for a suitable time of about 1 to 60 minutes. Plasma treatment of the surface of the write/read magnetic layer in an oxygen-containing atmosphere is also acceptable. The plasma treatment may be carried out by a conventional technique using a treating gas in the form of an inert gas containing 10 to 1,000 ppm of oxygen. Such interfacial treatment results in an oxide layer of about 30 to 100 Å thick. The thus formed oxides need not satisfy the stoichiometric composition.

In performing recording and reading of the magneto-optical disc 1 of the structure shown in FIG. 1, laser light is irradiated to the medium from the rear surface side (the lower side in FIG. 1) of the substrate 2. Therefore, the substrate 2 is a transparent one having high transmittance (preferably of at least 88%) to laser light, typically semiconductor laser light having a wavelength of about 400 to 900 nm, preferably about 500 to 800 nm, especially 780 nm. For example, the substrate is formed of transparent resins such as polycarbonate resins, acrylic resins, amorphous polyolefin resins, and styrene resins as well as glass.

The enhancement layer 3 is effective for improving C/N and preventing the write/read magnetic layer 4 from corrosion. It is about 400 to 2,000 Å thick. The enhancement layer 3 may be formed of a dielectric material as used in the non-magnetic layer 5.

Typically sputtering is used to form the enhancement layer 3, write/read magnetic layer 4, non-magnetic layer 5 (excluding the one formed by interfacial treatment), and auxiliary magnetic layer 6. Sputtering conditions are conventional.

The protective coat 7 is a resin film formed for protecting the underlying sputtered films. The resin of which the protective coat 7 is made is not critical although cured products of radiation-curable compounds are preferred. Preferred radiation-curable compounds are acryl group-containing ones. Preferably a coating of an acryl-containing compound and a photo-polymerization sensitizer or initiator is cured with ultraviolet radiation or electron ray to form a protective coat. The protective coat preferably has a thickness of about 1 to 30 µm, more preferably about 2 to 20 µm. With a thickness below this range, it would be difficult to form a film of uniform thickness, resulting in a loss of durability. A too thick film would crack due to shrinkage during curing so that the disc tends to warp.

On the rear surface of the substrate 2 is formed a transparent hard coating 8 as shown in FIG. 1, if desired. The composition and thickness of the hard coating may be the same as the protective coat 7. Preferably the hard coating is rendered antistatic by adding a surfactant or the like. The hard coating may be disposed not only on the rear surface of the substrate, but also on the inner and outer peripheral edges of the disc.

If desired, the magneto-optical disc 1 of FIG. 1 may further include another enhancement layer of dielectric material on the auxiliary magnetic layer 6. This additional enhancement layer has the functions of C/N improvement and a protective film and is about 100 to 1,000 Å thick. It may be formed of dielectric materials, preferably compounds containing Si and Al, for example, SiN and AlN. Additionally, a reflecting layer may be formed on the auxiliary magnetic layer 6 or the additional enhancement layer thereon. The reflecting layer is formed of metals such as Au, Ag, Pt, Al, Ti, Cr, Ni and Co, and alloys and compounds thereof. The reflecting layer may be about 300 to 2,000 Å thick. Such an enhancement layer and reflecting layer may be formed by sputtering.

EXAMPLE

Examples of the present invention are given below by way of illustration and not by way of limitation.

Example 1

A magneto-optical disc 1 as shown in FIG. 1 was prepared by successively forming an enhancement layer 3, a write/read magnetic layer 4, a non-magnetic layer 5, an auxiliary magnetic layer 6, and a protective coat 7 on a substrate 2. The substrate used was a polycarbonate resin disc having an outer diameter of 86 mm, an inner diameter of 15 mm and a thickness of 1.2 mm (tracking pitch 1.6 µm).

After a vacuum chamber was evacuated to a vacuum of at least $5.0\times10^{-5}$ Pa, the enhancement layer was formed on the substrate by magnetron sputtering of a silicon target while passing argon gas and nitrogen gas through the chamber. The sputtering conditions included an input power of 1 kW (RF), a sputtering gas pressure of 0.1 Pa, an Ar gas flow rate of 31 SCCM, and a $N_2$ gas flow rate of 19 SCCM. The enhancement layer consisted essentially of Si-N and was 600 Å thick.

The substrate was then transferred to a magnetic layer-forming vacuum chamber through a vacuum path. The vacuum chamber was evacuated to a vacuum of at least $5.0\times10^{-5}$ Pa. While passing argon gas through the chamber, magnetron sputtering of a $Tb_{21}$—$Fe_{69}$—$Co_7$—$Cr_3$ alloy (expressed in atom %) as a target was carried out to form a write/read magnetic layer having the composition: $Tb_{21.1}$—$Fe_{68.7}$—$Co_{7.2}$—$Cr_{3.0}$. The sputtering conditions included an input power of 1 kW (DC), a sputtering gas pressure of 0.2 Pa, and an Ar gas flow rate of 98 SCCM. The write/read magnetic layer was 200 Å thick.

The non-magnetic layer was formed on the magnetic layer under the same conditions as used for the enhancement layer. The no-magnetic layer was 200 Å thick.

Next, the auxiliary magnetic layer was formed on the non-magnetic layer by magnetron sputtering a $Gd_{20}$—$Fe_{70}$—$Co_{10}$ alloy (expressed in atom %) as a target under the same conditions as used for the write/read magnetic layer. The auxiliary magnetic layer had the composition: $Gd_{20.3}$—$Fe_{69.7}$—$Co_{10.0}$ and was 800 Å thick.

The protective coat was formed on the auxiliary magnetic layer by spin coating a polymerizable composition comprising 50 parts by weight of an oligo-ester acrylate having a molecular weight of 5,000, 50 parts by weight of trimethylolpropane triacrylate, and 3 parts by weight of an acetophenone photo-polymerization initiator. The coating was exposed to UV for curing. The coat as cured had an average thickness of about 5 µm.

In this way, a magneto-optical disc designated sample No. 1 was obtained. Note that the thickness of each sputtered layer was calculated from the sputtering rate and sputtering time. The sputtering rate was previously calculated by continuing sputtering under the same conditions as the actual film formation step for a longer time to form a thick film, measuring the thickness of the thick film, and dividing the thickness by the sputtering time.

The magneto-optical disc sample No. 1 was measured for polar Kerr hysteresis from the auxiliary magnetic layer side at room temperature (20° C.). The external magnetic field was changed in strength between −15 kOe and +15 kOe. A polar Kerr hysteresis curve as shown in FIG. 4 was obtained. Coercivity was determined from this polar Kerr hysteresis curve, finding that the write/read magnetic layer had a coercivity $H_{c1}$ of 11,000 Oe and the auxiliary magnetic layer had a coercivity $H_{c2}$ of 190 Oe. Kerr rotation angles were also determined from the polar Kerr hysteresis curve, finding that $|\theta_{k1}|=0.41°$ and $|\theta_{k2}|=0.32°$.

A polar Kerr hysteresis curve measured from the write/read magnetic layer side was as shown in FIG. 5.

Further, a minor loop due to the polar Kerr effect was determined in the temperature range from room temperature (20° C.) to the temperature of reading light irradiation (about 50° C.). The Kerr rotation angle remained equal before and after the applied magnetic field was reduced to 0 in the state that only the auxiliary magnetic layer had undergone magnetization reversal.

Next, the magneto-optical disc sample No. 1 was recorded in a light modulation mode using semiconductor laser light having a wavelength of 780 nm. The recording conditions included a linear velocity of 8 m/s, a recording frequency of 4 MHz, a recording external magnetic field strength of 50 Oe, and an optimum recording power (the recording power at which the secondary harmonic becomes minimum) of 3.5 mW.

From the thus recorded magneto-optical disc sample No. 1, the signals were read out using semiconductor laser light having a wavelength of 780 nm and a power of 2.0 mW. Before, an external magnetic field having a strength of 300 Oe was applied to the disc sample in the same direction as the recording external magnetic field, initializing the auxiliary magnetic layer. Then laser light of wavelength 780 nm was irradiated from the rear surface side (the write/read magnetic layer side) of the substrate for reading. On reading, a C/N ratio was measured to be 44.6 dB.

Example 2

Disc sample No. 1 was measured for C/N as in Example 1 except that the external magnetic field for initializing the auxiliary magnetic layer was applied in the direction of an erasing magnetic field. A C/N ratio of 44.2 dB was obtained.

Example 3

Disc sample No. 1 was measured for C/N as in Example 1 except that the strength of the recording external magnetic field was increased to 300 Oe for achieving initialization of the auxiliary magnetic layer at the same time as recording. A C/N ratio of 44.6 dB was obtained.

Example 4

Disc sample No. 1 was measured for C/N as in Example 1 except that the auxiliary magnetic layer was initialized during reading. The external magnetic field for initialization had a strength of 300 Oe. A C/N ratio of 44.6 dB was obtained.

Example 5

A magneto-optical disc sample No. 2 was prepared by the same procedure as disc sample No. 1 in Example 1 except that the step of forming the non-magnetic layer was omitted. Instead, after the write/read magnetic layer was formed to a thickness of 200 Å, the vacuum chamber was evacuated to a vacuum of at least $5.0 \times 10^{-5}$ Pa and argon gas containing 1,000 ppm of $O_2$ was passed therethrough as a treating gas. Interfacial treatment was carried out by exposing the surface of the write/read magnetic layer to the treating gas for 10 minutes while maintaining a gas pressure of 1.0 Pa. There was formed an oxide layer. The auxiliary magnetic layer was then formed on the oxide layer to a thickness of 800 Å. By Auger electron spectroscopy, it was found that as a result of interfacial treatment, the oxide layer was formed in the write/read magnetic layer from its surface to a depth of 70 Å.

The magneto-optical disc sample No. 2 was recorded and read by the procedures of Examples 1 to 4 to measure C/N on reading, obtaining equivalent results.

Comparative Example 1

Disc sample No. 1 was measured for C/N as in Example 1 except that recording was directly followed by reading, that is, without initialization of the auxiliary magnetic layer. A C/N ratio of 42.4 dB was obtained.

Comparative Example 2

A magneto-optical disc sample No. 3 was prepared by the same procedure as disc sample No. 1 in Example 1 except that an AlNi reflecting layer was formed instead of the auxiliary magnetic layer. After the non-magnetic layer of SiN dielectric material was formed, the vacuum chamber was evacuated to a vacuum of at least $5.0 \times 10^{-5}$ Pa again. The AlNi reflecting layer was formed to a thickness of 800 Å by magnetron sputtering an Al—Ni alloy target while passing argon gas through the chamber. The sputtering conditions included an input power of 750 W (DC), a sputtering gas pressure of 0.15 Pa, and an Ar gas flow rate of 10 SCCM.

Disc sample No. 3 was recorded and read by the same procedure as in Example 1 for measuring C/N on reading. A C/N ratio of 41.4 dB was obtained.

It is evident that improved C/N on reading is obtained by using a magneto-optical disc comprising a write/read magnetic layer and an auxiliary magnetic layer which have different coercivities and are magnetostatically coupled one another and applying the inventive method of reading information during or after initialization of the auxiliary magnetic layer.

Equivalent results to Examples 1 to 5 were obtained when the combination of the compositions of a write/read magnetic layer and an auxiliary magnetic layer in Examples 1 to 5 was replaced by other combinations as previously shown as combination Nos. 2 to 4.

The present invention improves the Kerr effect on reading, thereby improving C/N on reading.

Japanese Patent Application No. 336564/1994 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for reading recorded magnetization information from a magneto-optical recording medium comprising at least a first magnetic layer and a second magnetic layer having different coercivities, said medium including a number of sites at which magnetization reversal occurs along a polar Kerr hysteresis curve in a temperature range from room temperature to the temperature of reading light irradiation and said first and second magnetic layers meeting the following relationship:

$$|\theta_{k1}| > |\theta_{k2}|$$

wherein $\theta_{k1}$ is an apparent Kerr rotation angle when the first magnetic layer has not undergone magnetization reversal and the second magnetic layer has undergone magnetization reversal and $\theta_{k2}$ is an apparent Kerr rotation angle when both the first and second magnetic layers have undergone magnetization reversal, said method comprising the steps of:

applying an external magnetic field to the magneto-optical recording medium for at least one of a period before and a period during reading, and irradiating reading light onto the first magnetic layer for reading.

2. The method of claim 1 wherein said first magnetic layer has a coercivity $H_{c1}$, said second magnetic layer has a coercivity $H_{c2}$, and the external magnetic field applied for magnetizing said second magnetic layer in one direction has a strength $H_{ini}$, and said medium satisfies the relationship:

$$H_{c1} > H_{ini} > H_{c2}$$

in a temperature range from room temperature to the temperature of reading light irradiation.

3. The method of claim 1 wherein in a minor loop said medium exhibits due to the polar Kerr effect in a temperature range from room temperature to the temperature of reading light irradiation, when the applied external magnetic field is reduced to zero from the state that said first magnetic layer has not undergone magnetization reversal and the second magnetic layer has undergone magnetization reversal, the Kerr rotation angle remains equal to that before reduction of the applied external magnetic field to zero.

4. The method of claim 1 wherein said second magnetic layer is disposed on said first magnetic layer and further comprising a nonmagnetic layer therebetween.

5. The method of claim 1 wherein the difference in coercivity between said first and second magnetic layers is 2,000 to 15,000 Oe provided that coercivity is measured from the polar Kerr hysteresis curve in a temperature range from room temperature to the temperature of reading light irradiation.

6. The method of claim 1 wherein said first magnetic layer has a thickness of 150 to 1,500 Å.

7. The method of claim 1 wherein said second magnetic layer has a thickness of 100 to 2,000 Å.

8. The method of claim 4 wherein said non-magnetic layer has a thickness of 10 to 1,000 Å.

9. A magneto-optical recording medium comprising a substrate, a write/read magnetic layer and an auxiliary magnetic layer having different coercivities on said substrate, said medium including a number of sites at which magnetization reversal occurs along a polar Kerr hysteresis curve in a temperature range from room temperature to the temperature of reading light irradiation and said magnetic layers meeting the following relationship:

$$|\theta_{k1}| > |\theta_{k2}|$$

wherein $\theta_{k1}$ is an apparent Kerr rotation angle when the write/read magnetic layer has not undergone magnetization reversal and the auxiliary magnetic layer has undergone magnetization reversal and $\theta_{k2}$ is an apparent Kerr rotation angle when both the magnetic layers have undergone magnetization reversal, said medium being recorded and read by irradiating light toward the magnetic layers through the substrate.

10. The magneto-optical recording medium of claim 9 wherein in a minor loop said medium exhibits due to the polar Kerr effect in a temperature range from room temperature to the temperature of reading light irradiation, when an applied external magnetic field is reduced to zero from the state that said write/read magnetic layer has not undergone magnetization reversal and the auxiliary magnetic layer has undergone magnetization reversal, the Kerr rotation angle remains equal to that before reduction of the applied external magnetic field to zero.

11. The magneto-optical recording medium of claim 9 further comprising a non-magnetic layer intervening between said write/read magnetic layer and said auxiliary magnetic layer.

12. The magneto-optical recording medium of claim 9 wherein said auxiliary magnetic layer is disposed on the surface of said write/read magnetic layer which has been subject to interfacial treatment.

13. The magneto-optical recording medium of claim 9 wherein the difference in coercivity between said write/read magnetic layer and said auxiliary magnetic layer is 2,000 to 15,000 Oe provided that coercivity is measured from the polar Kerr hysteresis curve in a temperature range from room temperature to the temperature of reading light irradiation.

14. The magneto-optical recording medium of claim 9 wherein said write/read magnetic layer has a thickness of 150 to 1,500 Å.

15. The magneto-optical recording medium of claim 9 wherein said auxiliary magnetic layer has a thickness of 100 to 2,000 Å.

16. The method of claim 11 wherein said non-magnetic layer has a thickness of 10 to 1,000 Å.

17. The method of claim 1 wherein said second magnetic layer is disposed on said first magnetic layer and said first magnetic layer has received interfacial treatment.

* * * * *